United States Patent
Kloper

(10) Patent No.: US 11,184,849 B2
(45) Date of Patent: Nov. 23, 2021

(54) USE OF TARGET WAKE TIME TO REDUCE DELIVERY TRAFFIC INDICATION MESSAGE MULTICAST

(71) Applicant: Cisco Technology, Inc., San Jose, CA (US)

(72) Inventor: David Kloper, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/572,689

(22) Filed: Sep. 17, 2019

(65) Prior Publication Data

US 2021/0084588 A1 Mar. 18, 2021

(51) Int. Cl.
*H04W 52/02* (2009.01)
*H04W 84/12* (2009.01)

(52) U.S. Cl.
CPC ............ *H04W 52/0219* (2013.01); *H04W 52/0216* (2013.01); *H04W 52/0222* (2013.01); *H04W 84/12* (2013.01)

(58) Field of Classification Search
CPC ......... H04W 52/0219; H04W 52/0222; H04W 52/0216; H04W 84/12
See application file for complete search history.

(56) References Cited

U.S. PATENT DOCUMENTS

| | | | |
|---|---|---|---|
| 7,362,757 B2 | 4/2008 | Griswold et al. | |
| 8,953,598 B2 | 2/2015 | Zhang et al. | |
| 10,021,645 B2 | 7/2018 | Bhanage et al. | |
| 2006/0268873 A1* | 11/2006 | Tonjes | H04L 41/0896 370/392 |
| 2011/0134918 A1* | 6/2011 | Field | H04L 12/1868 370/390 |
| 2012/0039334 A1* | 2/2012 | Mehta | H04L 12/18 370/390 |
| 2013/0194999 A1* | 8/2013 | Anchan | H04W 76/40 370/312 |
| 2013/0229959 A1* | 9/2013 | Ghosh | H04W 74/08 370/311 |
| 2015/0365885 A1* | 12/2015 | Yang | H04W 48/16 370/312 |
| 2018/0115950 A1 | 4/2018 | Asterjadhi et al. | |
| 2018/0234918 A1* | 8/2018 | Asterjadhi | H04W 52/0229 |

(Continued)

*Primary Examiner* — Christine Ng

(74) *Attorney, Agent, or Firm* — Edell, Shapiro & Finnan, LLC

(57) ABSTRACT

Presented herein are methodologies for handling multicast traffic that is transmitted to mobile devices in a given basic service set (BSS). The methodology includes detecting membership of clients in an Internet Protocol (IP) multicast group in a basic service set of a wireless network; determining whether the IP multicast group and its associated multicast traffic meet predetermined criteria; when the IP multicast group and its associated multicast traffic meet the predetermined criteria, negotiating with each client in the IP multicast group to have a target wake time (TWT) that includes, at least, a coincident overlap window of sufficient duration to transmit the multicast traffic associated with the IP multicast group; and transmitting the multicast traffic associated with the IP multicast group during the coincident overlap window, wherein the coincident overlap window is different from a delivery traffic indication message (DTIM) service period.

20 Claims, 4 Drawing Sheets

(56) References Cited

U.S. PATENT DOCUMENTS

2019/0246354 A1\* 8/2019 Huang .............. H04W 52/0216
2020/0221381 A1\* 7/2020 Homchaudhuri ............................
                                                    H04W 52/0274

\* cited by examiner

USE OF TARGET WAKE TIME TO REDUCE DELIVERY TRAFFIC INDICATION MESSAGE MULTICAST

TECHNICAL FIELD

The present disclosure relates to wireless local area networking, and specifically to more efficient handling of multicast traffic that is transmitted to mobile devices in a given basic service set (BSS).

BACKGROUND

Target Wake Time (TWT) is a mechanism first specified in wireless local area network (LAN) standard 802.11ah, and further enhanced in the 802.11ax wireless LAN standard, that allows clients to negotiate their sleep times and wake up intervals with their serving access points (APs). The main purpose of the TWT feature is to help improve client battery life, by the staggering of wake up times of multiple clients with client suggested periodicity rather than having each client wake up after a beacon and contend, all at once, for medium access. Chipset vendors are implementing the TWT feature such that the clients waking up in a BSS can be grouped for minimal contention or optimal communication (using, e.g., orthogonal frequency-division multiple access (OFDMA)).

Further in accordance with the 802.11 wireless LAN standard, when a wireless client in a BSS is in the doze power save state, all multicast traffic within the BSS, is held until a periodic Delivery Traffic Indication Message (DTIM) time, and the multicast traffic is transmitted during the DTIM service period. This functionality was extended with U.S. Pat. No. 7,362,757, entitled "Optimizing 802.11 Power-Save for IP Multicast Groups", where each Internet Protocol (IP) multicast flow might only be held until the DTIM, when a wireless client in a BSS is both in the doze power save state and is subscribed to that IP multicast group.

DESCRIPTION OF EXAMPLE EMBODIMENTS

Overview

Figure 1:
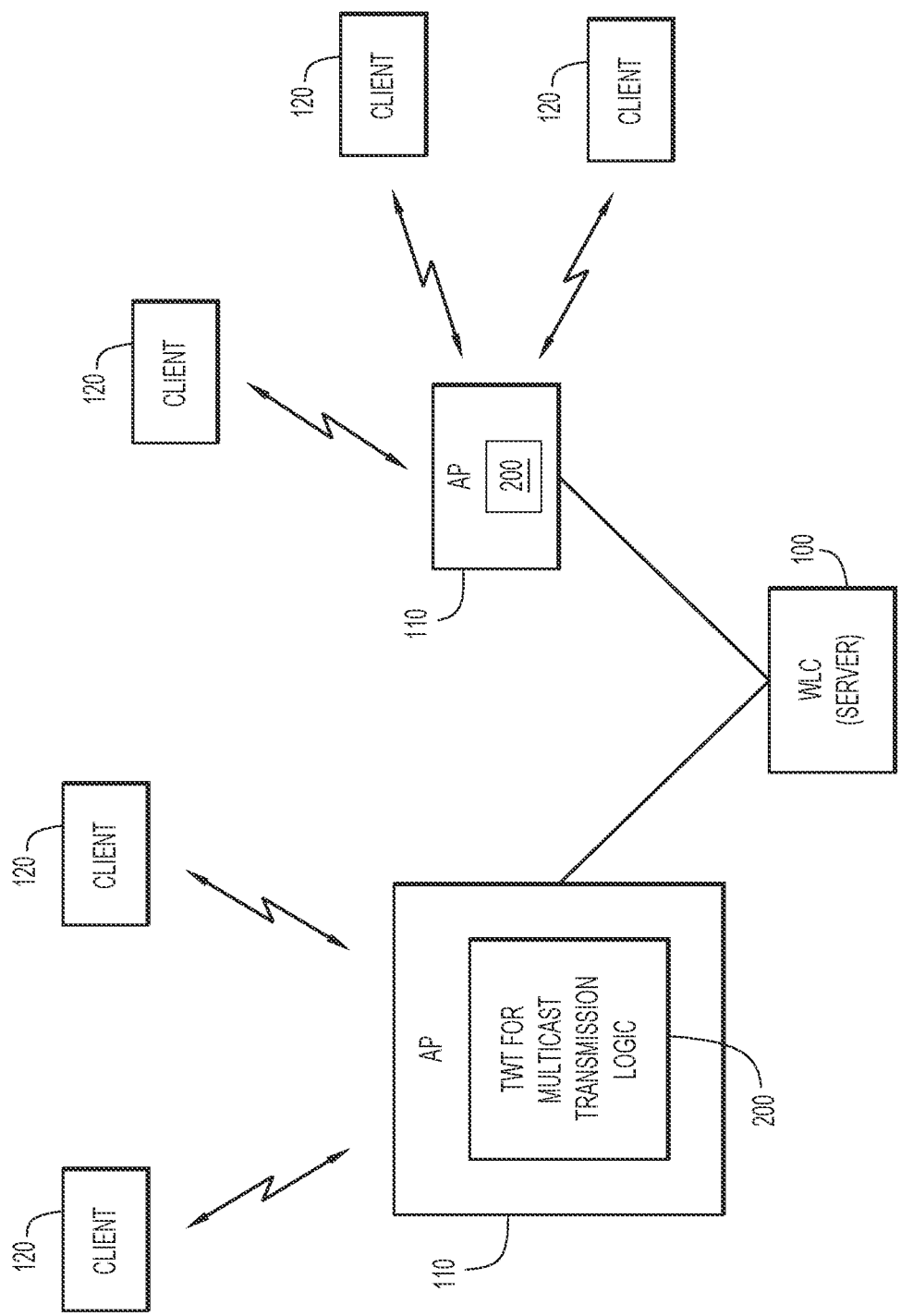
FIG. 1 depicts components of a network, including access points, mobile clients, a wireless LAN controller and TWT for multicast transmission logic in accordance with an example embodiment.

Presented herein are methodologies for handling multicast traffic that is transmitted to mobile devices in a given BSS. The methodology includes detecting membership of clients in an Internet Protocol (IP) multicast group in a basic service set of a wireless network; determining whether the IP multicast group and its associated multicast traffic meet predetermined criteria; when the IP multicast group and its associated multicast traffic meet the predetermined criteria, negotiating with each client in the IP multicast group to have a target wake time (TWT) that includes, at least, a coincident overlap window of sufficient duration to transmit the multicast traffic associated with the IP multicast group; and transmitting the multicast traffic associated with the IP multicast group during the coincident overlap window, wherein the coincident overlap window is different from a delivery traffic indication message (DTIM) service period.

A device or apparatus is also described. The device may include an interface unit configured to enable network communications, a memory, and one or more processors coupled to the interface unit and the memory, and configured to: detect membership of clients in an Internet Protocol (IP) multicast group in a basic service set of a wireless network; determining whether the IP multicast group and its associated multicast traffic meet predetermined criteria; when the IP multicast group and its associated multicast traffic meet the predetermined criteria, negotiate with each client in the IP multicast group to have a target wake time (TWT) that includes, at least, a coincident overlap window of sufficient duration to transmit the multicast traffic associated with the IP multicast group; and transmit the multicast traffic associated with the IP multicast group during the coincident overlap window, wherein the coincident overlap window is different from a delivery traffic indication message (DTIM) service period.

Example Embodiments

As noted, in accordance with the 802.11 wireless LAN standard, when a wireless client in a BSS is in the doze power save state, all multicast traffic within the BSS is held until a scheduled DTIM time. However, this approach can increase latency (i.e., all clients have to wait for the DTIM time to receive any multicast traffic). This approach also results in longer priority inversions when all the multicast being held for the BSS is delivered within a short time window in preference to other traffic of possibly higher priority.

As will be explained in more detail below, instead of transmitting selected multicast traffic during the DTIM time, respective TWTs of clients may be arranged or established for the additional purpose of sending multicast traffic to selected IP multicast groups. By sending the multicast traffic during a separate TWT, not aligned with the DTIM time, it is possible, among other potential benefits, to reduce the noted potential latency for that flow, to split the priority inversion into smaller periods, and to reduce the impact to clients not interested in this multicast flow.

FIG. 1 depicts components of a network, including access points, mobile clients, a wireless LAN controller and TWT for multicast transmission logic in accordance with an example embodiment. Specifically, wireless LAN controller (WLC) 100 controls a plurality of access points (APs) 110, which may respectively wirelessly serve a plurality of clients 120. A given client 120 may be a mobile device such as a smart phone, tablet, laptop computer, or any other device configured to communicate wirelessly with an AP 110.

AP 110, although shown as a physical component (which might include multiple radios (each having multiple of its own BSS identifier (BSSID) and antennas, etc.), can also be considered as providing a network access function, which might be split between the physical components of the AP 110 and the WLC 100.

In operation under the 801.11 standard, each BSSID on a given channel will have its own DTIM to carry, among other transmissions, multicast traffic to clients 120 associated with that specific BSSID on that given channel. That is, queued or buffered multicast traffic is held to be sent out during the DTIM while the BSS has clients in the doze power save state (unless the Multicast traffic was further filtered per Policy).

To alleviate the noted potential latency and priority inversion issues associated with such an approach, it was previously suggested in U.S. Pat. No. 7,362,757 to track the client's subscription to IP Multicast groups, and to selectively only hold such flows for DTIM delivery when one of the subscribed clients is in the doze power save state. To further alleviate the noted potential latency and priority inversion issues, TWT for multicast transmission logic 200 (or "logic 200") may be deployed on AP 110 and/or, at least partially, on WLC 100 where feasible. TWT for multicast transmission logic 200 is configured to identify a "qualified" multicast group, and to negotiate with each client in the multicast group to have a TWT that includes, at least, a coincident overlap window (i.e., a window of time that is coincident with other TWTs of clients in the BSS and multicast group) of sufficient duration to transmit the multicast traffic associated with the multicast group. Logic 200 is further configured to transmit the multicast traffic associated with the multicast group during the coincident overlap window. Notably, the coincident overlap window is different from a delivery traffic indication message (DTIM) service period. Whether a given multicast group is qualified to have a TWT for multicast transmission established may depend on several factors as described below.

Figure 2:
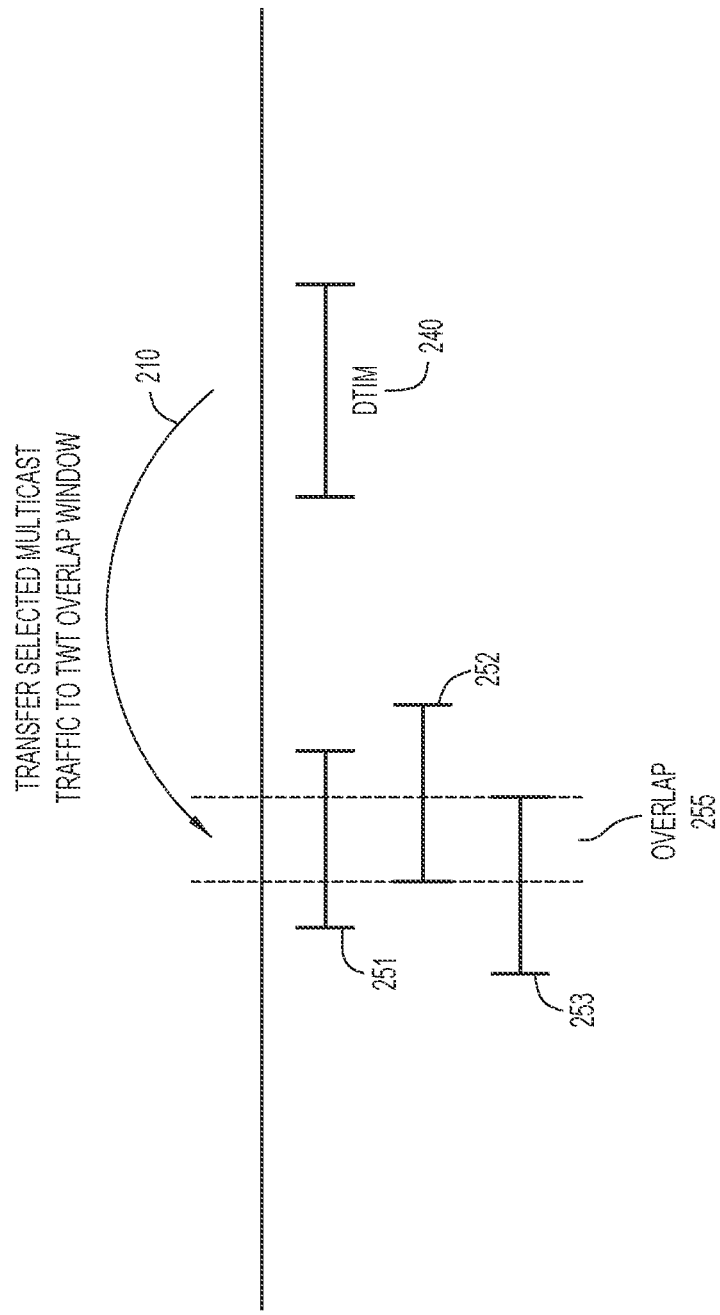
FIG. 2 shows how selected multicast traffic, which would normally be transmitted during a DTIM service period, is instead transmitted during a coincident overlap window of multiple TWTs.

More specifically, when an IP multicast group is only of interest to a subset of the associated clients being served by a given AP 110, and the clients in the subset are, e.g., compliant with the 802.11 standard and support TWT, TWT for multicast transmission logic 200 is configured to consider establishing or modifying the respective TWTs for those clients, and move the associated multicast traffic from a single (possibly, larger) DTIM service period to a (possibly, shorter) TWT service period. FIG. 2 shows how selected multicast traffic 210, which would normally be transmitted during a DTIM service period 240, is instead transmitted during a coincident overlap window 255 of multiple TWTs 251, 252, 253.

In accordance with an embodiment, TWT for multicast transmission logic 200 is configured to learn of a multicast group, and its membership. This can be achieved by snooping Internet Group Management Protocol (IGMP) messages, for instance. Once multicast group and memberships are identified, TWT for multicast transmission logic 200 is configured to exclude, from further consideration, multicast groups that do not match all of the following:

a) All members support TWT;
b) The number of members of the group is below a predetermined threshold, either as a fixed number or percentage of associated client stations (STAs);
c) The amount of multicast traffic for a given group is above a predetermined threshold, such as bit per second (bps), packets per second (pps), or Air Time per second;
d) The average DTIM service period is above an optional predetermined threshold.

As an example of (b) and (c) above, a multicast group might not be excluded from further consideration if the multicast traffic utilizes an average of more than 1 ms of air time per DTIM service period, while it is of interest to less than 20% of the clients.

Once qualified multicast groups are identified via the approach above, TWT for multicast transmission logic 200 may trigger one of two TWT actions. In a first possible action, TWT for multicast transmission logic 200 may cause an AP 110 to adjust one existing TWT per client 120 that is part of the multicast group such that all clients in the multicast group have at least one common TWT phase of overlap (i.e., coincident overlap window 255) with sufficient duration to support the multicast group. TWT for multicast transmission logic 200 may also optionally cause other clients' TWTs to not align with the adjusted TWT, i.e., to reduce an overlap with the coincident overlap window 255.

In a second possible action, TWT for multicast transmission logic 200 may cause an AP 110 to establish a new TWT with each multicast group member that minimizes alignment with other TWTs (i.e., the newly-established TWT may be negotiated for the purpose of transmitting multicast traffic that would otherwise be transmitted during a DTIM service period).

With such adjusted or new TWTs established by operation of TWT for multicast transmission logic 200, when multicast traffic is present for a given multicast group, with any member in the doze power save state, the multicast traffic is transmitted during a period of overlap of the adjusted or new TWTs. In this way, multicast traffic that is of interest to only a subset of clients is sent during a TWT in preference to the DTIM service period.

From the foregoing, it should be understood that TWT for multicast transmission logic 200 is configured to establish a TWT for the purpose of transmitting multicast group traffic. It is noted that, for scaling reasons, it is also possible, when clients are members of multiple groups, to collapse two or more multicast groups into the same TWT that is established by TWT for multicast transmission logic 200.

Figure 3:
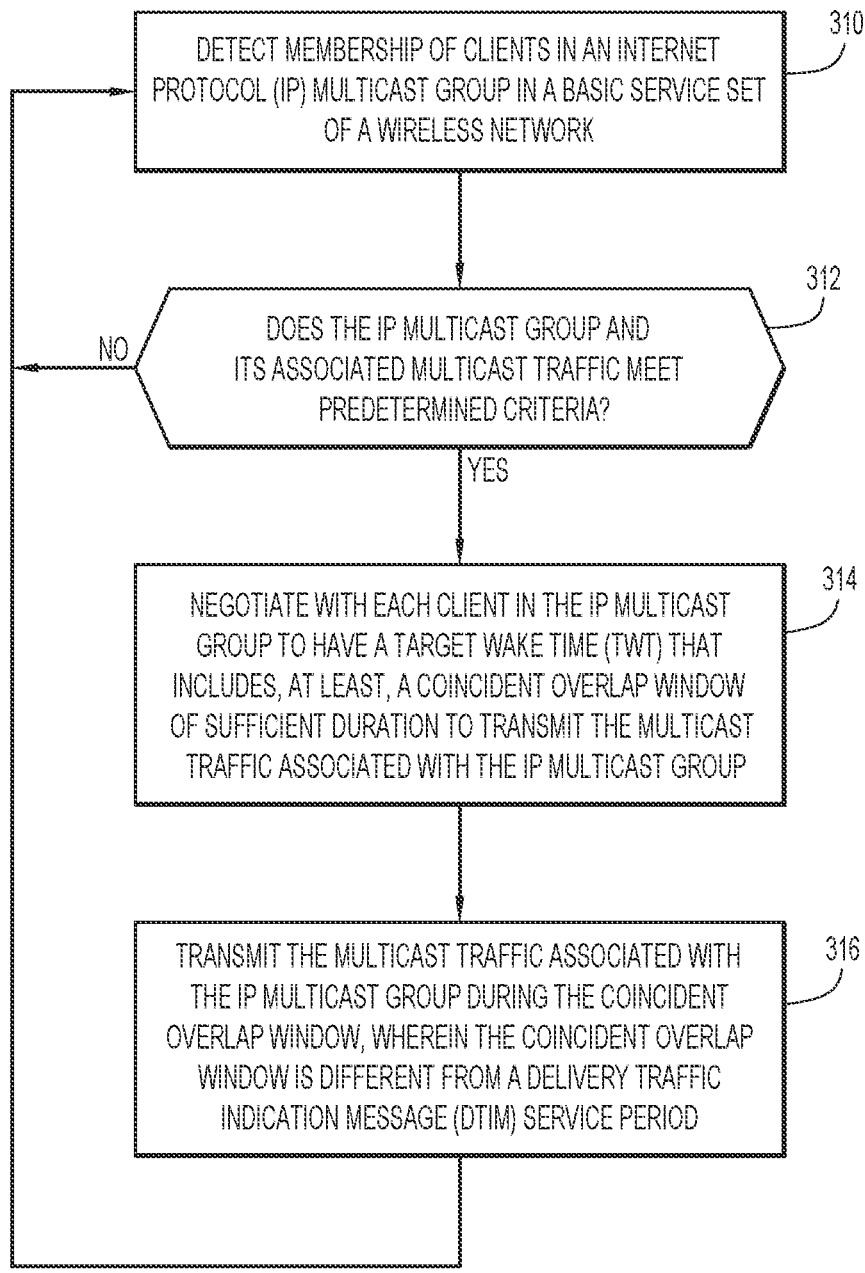
FIG. 3 is a flow chart depicting a series of operations performed by TWT for multicast transmission logic in accordance with an example embodiment.

FIG. 3 is a flow chart depicting a series of operations performed by TWT for multicast transmission logic 200 (or "the logic") in accordance with an example embodiment. At 310, the logic is configured to detect membership of clients in an Internet Protocol (IP) multicast group in a basic service set of a wireless network. At 312, the logic is configured to determine whether the IP multicast group and its associated multicast traffic meet predetermined criteria. At 314, when the IP multicast group and its associated multicast traffic meet the predetermined criteria, the logic is configured to negotiate with each client in the IP multicast group to have a target wake time (TWT) that includes, at least, a coincident overlap window of sufficient duration to transmit the multicast traffic associated with the IP multicast group. And, at 316, the logic is configured to transmit the multicast traffic associated with the IP multicast group during the coincident overlap window, wherein the coincident overlap window is different from a delivery traffic indication message (DTIM) service period.

The predetermined criteria may include whether clients of a multicast group support TWT operations, whether a number of members of the multicast group is below a predetermined threshold, whether the amount (e.g., bsp, pps, and/or air time) is above a predetermined threshold, and/or whether the DTIM service period is above a predetermined threshold.

Figure 4:
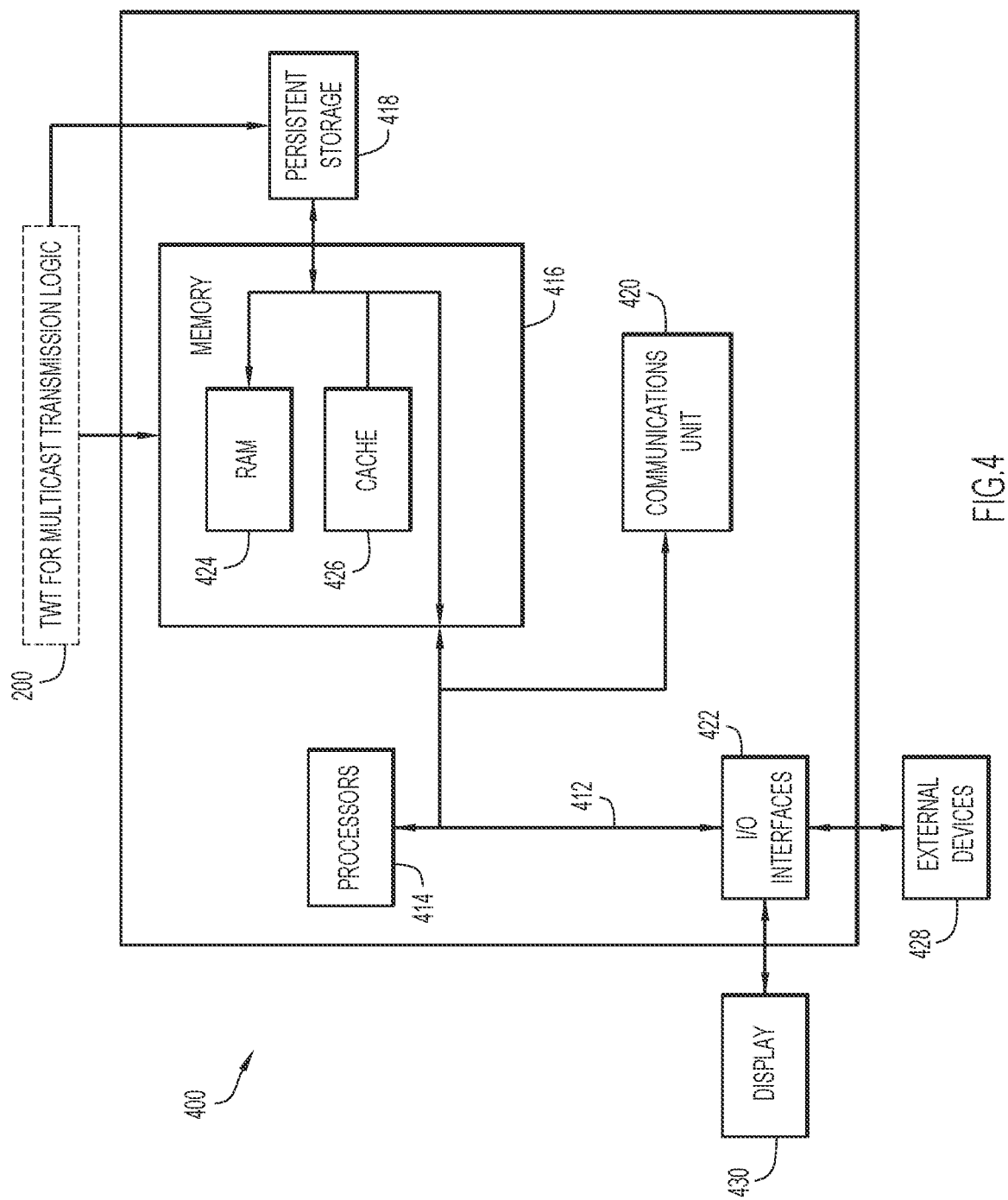
FIG. 4 depicts a device (e.g., an access point or a server) that might host and execute TWT for multicast transmission logic in accordance with an example embodiment.

FIG. 4 depicts a device 400 (e.g., an AP 110) that executes TWT for multicast transmission logic 200 in accordance with an example embodiment. It should be appreciated that FIG. 4 provides only an illustration of one embodiment and does not imply any limitations with regard to the environments in which different embodiments may be implemented. Many modifications to the depicted environment may be made. Indeed, in many implementations of an AP 110 configured to host TWT for multicast transmission logic 200, much of the hardware described below may not be needed.

As depicted, the device 400 includes a bus 412, which provides communications between computer processor(s) 414, memory 416, persistent storage 418, communications unit 420, and input/output (I/O) interface(s) 422. Bus 412 can be implemented with any architecture designed for passing data and/or control information between processors (such as microprocessors, communications and network processors, etc.), system memory, peripheral devices, and any other hardware components within a system. For example, bus 412 can be implemented with one or more buses.

Memory 416 and persistent storage 418 are computer readable storage media. In the depicted embodiment, memory 416 includes random access memory (RAM) 424 and cache memory 426. In general, memory 416 can include any suitable volatile or non-volatile computer readable storage media.

One or more programs (e.g., TWT for multicast transmission logic 200) may be stored in persistent storage 418 for execution by one or more of the respective computer processors 414 via one or more memories of memory 416. The persistent storage 418 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. For example, the one or more programs may include software instructions that, when executed by the one or more processors 414, cause the computing device 400 to perform the operations of, e.g., FIG. 3.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Communications unit 420, in these examples, provides for communications with other data processing systems or devices. In these examples, communications unit 420 includes one or more network interface cards. Communications unit 420 may provide communications through the use of either or both physical and wireless communications links.

I/O interface(s) 422 allows for input and output of data with other devices that may be connected to computer device 400. For example, I/O interface 422 may provide a connection to external devices 428 such as a keyboard, keypad, a touch screen, and/or some other suitable input device. External devices 428 can also include portable computer readable storage media such as database systems, thumb drives, portable optical or magnetic disks, and memory cards.

Software and data used to practice embodiments can be stored on such portable computer readable storage media and can be loaded onto persistent storage 418 via I/O interface(s) 422. I/O interface(s) 422 may also connect to a display 430. Display 430 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes detecting membership of clients in an Internet Protocol (IP) multicast group in a basic service set of a wireless network; determining whether the IP multicast group and its associated multicast traffic meet predetermined criteria; when the IP multicast group and its associated multicast traffic meet the predetermined criteria, negotiating with each client in the IP multicast group to have a target wake time (TWT) that includes, at least, a coincident overlap window of sufficient duration to transmit the multicast traffic associated with the IP multicast group; and transmitting the multicast traffic associated with the IP multicast group during the coincident overlap window, wherein the coincident overlap window is different from a delivery traffic indication message (DTIM) service period.

In an embodiment, detecting the membership of clients in the IP multicast group includes analyzing Internet Group Management Protocol (IGMP) messages sent by respective members of the multicast group.

In one embodiment, the method may include negotiating a new TWT for a client of sufficient duration to transmit the multicast traffic associated with the IP multicast group In another embodiment, the method may include adjusting a timing of an already-existing TWT for a given client so that the already-existing TWT includes, at least, the coincident overlap window.

In still another embodiment, the method may include negotiating a first TWT of a non-member of the IP multicast group to have a timing that reduces an overlap with the coincident overlap window.

In an embodiment, the predetermined criteria includes a number of members in the IP multicast group In another embodiment, the predetermined criteria comprises an amount of air time being consumed by the multicast traffic associated with the IP multicast group during an average DTIM interval, a threshold for bits per second for the multicast traffic associated with the IP multicast group, and/or a threshold for packets per second for the multicast traffic associated with the IP multicast group.

The method still further include negotiating the coincident overlap window of the TWT so as to be of sufficient duration for transmission of multiple multicast groups.

In another form, a device may also be provided in accordance with an embodiment. The device may include an interface unit configured to enable network communications; a memory; and one or more processors coupled to the interface unit and the memory, and configured to: detect membership of clients in an Internet Protocol (IP) multicast group in a basic service set of a wireless network; determine whether the IP multicast group and its associated multicast traffic meet predetermined criteria; when the IP multicast group and its associated multicast traffic meet the predetermined criteria, negotiate with each client in the IP multicast group to have a target wake time (TWT) that includes, at least, a coincident overlap window of sufficient duration to transmit the multicast traffic associated with the IP multicast group; and transmit the multicast traffic associated with the IP multicast group during the coincident overlap window, wherein the coincident overlap window is different from a delivery traffic indication message (DTIM) service period.

In an embodiment the one or more processors may be configured to negotiate a new TWT for each client of sufficient duration to transmit the multicast traffic associated with the IP multicast group.

In another embodiment the one or more processors may be configured to adjust a timing of an already-existing TWT for a given client so that the already-existing TWT includes, at least, the coincident overlap window.

In another embodiment the one or more processors may be configured to negotiate a first TWT of a non-member of the IP multicast group to have a timing that reduces an overlap with the coincident overlap window.

In an embodiment, the predetermined criteria may include a number of members in the IP multicast group. The predetermined criteria may also include an amount of air time being consumed by the multicast traffic associated with the IP multicast group during an average DTIM interval.

In still another form, a non-transitory computer readable storage media is provided that is encoded with instructions that, when executed by a processor, cause the processor to detect membership of clients in an Internet Protocol (IP) multicast group in a basic service set of a wireless network; determine whether the IP multicast group and its associated multicast traffic meet predetermined criteria; when the IP multicast group and its associated multicast traffic meet the predetermined criteria, negotiate with each client in the IP multicast group to have a target wake time (TWT) that includes, at least, a coincident overlap window of sufficient duration to transmit the multicast traffic associated with the IP multicast group; and transmit the multicast traffic associated with the IP multicast group during the coincident overlap window, wherein the coincident overlap window is different from a delivery traffic indication message (DTIM) service period.

The instructions may further include instructions that, when executed by a processor, cause the processor to negotiate a new TWT for each client of sufficient duration to transmit the multicast traffic associated with the IP multicast group.

In an embodiment, the predetermined criteria may include a number of members in the multicast group. The predetermined criteria may also include an amount of air time being consumed by the multicast traffic associated with the IP multicast group during an average DTIM interval.

The above description is intended by way of example only. Various modifications and structural changes may be made therein without departing from the scope of the concepts described herein and within the scope and range of equivalents of the claims.

What is claimed is:

1. A method comprising:
    detecting membership of clients in an Internet Protocol (IP) multicast group in a basic service set of a wireless network;
    determining whether the IP multicast group and its associated multicast traffic meet predetermined criteria;
    when the IP multicast group and its associated multicast traffic meet the predetermined criteria, negotiating with each client in the IP multicast group to have a target wake time (TWT) that includes, at least, a coincident overlap window of sufficient duration to transmit the multicast traffic associated with the IP multicast group, wherein a first target wake time of a first client in the IP multicast group has a first beginning time and a first ending time, a second target wake time of a second client in the IP multicast group has a second beginning time and a second ending time, and the second beginning time is disposed between the first beginning time and the first ending time; and
    transmitting the multicast traffic associated with the IP multicast group during the coincident overlap window, wherein the coincident overlap window is different from a delivery traffic indication message (DTIM) service period.

2. The method of claim 1, wherein detecting the membership of clients in the IP multicast group comprises analyzing Internet Group Management Protocol (IGMP) messages sent by respective members of the multicast group.

3. The method of claim 1, further comprising negotiating a new TWT for a client of sufficient duration to transmit the multicast traffic associated with the IP multicast group.

4. The method of claim 1, further comprising adjusting a timing of an already-existing TWT for a given client so that the already-existing TWT includes, at least, the coincident overlap window.

5. The method of claim 1, further comprising negotiating a first TWT of a non-member of the IP multicast group to have a timing that reduces overlap with the coincident overlap window.

6. The method of claim 1, wherein the predetermined criteria comprises a number of members in the IP multicast group.

7. The method of claim 1, wherein the predetermined criteria comprises an amount of air time being consumed by the multicast traffic associated with the IP multicast group during an average DTIM interval.

8. The method of claim 1, wherein the predetermined criteria comprises a threshold for bits per second for the multicast traffic associated with the IP multicast group.

9. The method of claim 1, wherein the predetermined criteria comprises a threshold for packets per second for the multicast traffic associated with the IP multicast group.

10. The method of claim 1, further comprising negotiating the coincident overlap window of the TWT so as to be of sufficient duration for transmission of multiple multicast groups.

11. A device comprising:
    a wireless interface;
    a memory; and
    one or more processors coupled to the wireless interface unit and the memory, and configured to:
        detect membership of clients in an Internet Protocol (IP) multicast group in a basic service set of a wireless network;
        determine whether the IP multicast group and its associated multicast traffic meet predetermined criteria;
        when the IP multicast group and its associated multicast traffic meet the predetermined criteria, negotiate with each client in the IP multicast group to have a target wake time (TWT) that includes, at least, a coincident overlap window of sufficient duration to transmit the multicast traffic associated with the IP multicast group, wherein a first target wake time of a first client in the IP multicast group has a first beginning time and a first ending time, a second target wake time of a second client in the IP multicast group has a second beginning time and a second ending time, and the second beginning time is disposed between the first beginning time and the first ending time; and
        transmit the multicast traffic associated with the IP multicast group during the coincident overlap window, wherein the coincident overlap window is different from a delivery traffic indication message (DTIM) service period.

12. The device of claim 11, wherein the one or more processors are further configured to negotiate a new TWT for each client of sufficient duration to transmit the multicast traffic associated with the IP multicast group.

13. The device of claim 11, wherein the one or more processors are further configured to adjust a timing of an already-existing TWT for a given client so that the already-existing TWT includes, at least, the coincident overlap window.

14. The device of claim 13, wherein the one or more processors are further configured to negotiate a first TWT of a non-member of the IP multicast group to have a timing that reduces overlap with the coincident overlap window.

15. The device of claim 11, wherein the predetermined criteria comprises a number of members in the IP multicast group.

16. The device of claim 11, wherein the predetermined criteria comprises an amount of air time being consumed by the multicast traffic associated with the IP multicast group during an average DTIM interval.

17. A non-transitory computer readable storage media encoded with instructions that, when executed by a processor, cause the processor to:
    detect membership of clients in an Internet Protocol (IP) multicast group in a basic service set of a wireless network;
    determine whether the IP multicast group and its associated multicast traffic meet predetermined criteria;
    when the IP multicast group and its associated multicast traffic meet the predetermined criteria, negotiate with each client in the IP multicast group to have a target wake time (TWT) that includes, at least, a coincident overlap window of sufficient duration to transmit the multicast traffic associated with the IP multicast group, wherein a first target wake time of a first client in the IP multicast group has a first beginning time and a first ending time, a second target wake time of a second client in the IP multicast group has a second beginning time and a second ending time, and the second beginning time is disposed between the first beginning time and the first ending time; and transmit the multicast traffic associated with the IP multicast group during the coincident overlap window, wherein the coincident overlap window is different from a delivery traffic indication message (DTIM) service period.

18. The non-transitory computer readable storage media of claim 17, wherein the instructions, when executed by the processor, are configured to negotiate a new TWT for each client of sufficient duration to transmit the multicast traffic associated with the IP multicast group.

19. The non-transitory computer readable storage media of claim 17, wherein the predetermined criteria comprises a number of members in the multicast group.

20. The non-transitory computer readable storage media of claim 17, wherein the predetermined criteria comprises an amount of air time being consumed by the multicast traffic associated with the IP multicast group during an average DTIM interval.

* * * * *

UNITED STATES PATENT AND TRADEMARK OFFICE
CERTIFICATE OF CORRECTION

| | |
|---|---|
| PATENT NO. | : 11,184,849 B2 |
| APPLICATION NO. | : 16/572689 |
| DATED | : November 23, 2021 |
| INVENTOR(S) | : David Kloper |

It is certified that error appears in the above-identified patent and that said Letters Patent is hereby corrected as shown below:

In the Claims

Claim 11, Column 12, Line 5, please replace "unit and the memory" with --and the memory--

Signed and Sealed this
Eighteenth Day of October, 2022

*Katherine Kelly Vidal*

Katherine Kelly Vidal
*Director of the United States Patent and Trademark Office*